Nov. 23, 1943.   J. F. NEUMUELLER ET AL   2,335,076
ORTHOPTIC INSTRUMENT
Filed Oct. 13, 1941   2 Sheets-Sheet 2
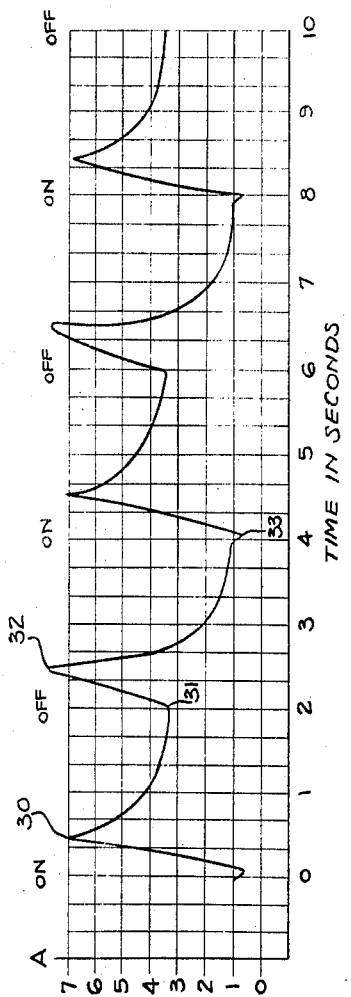
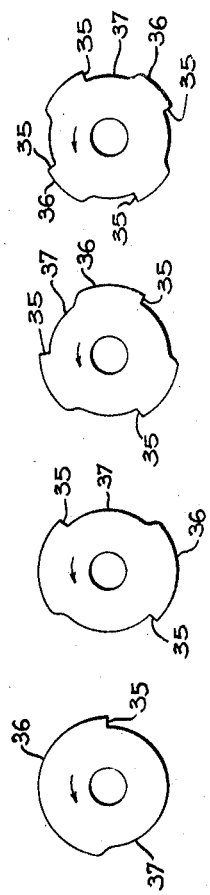
INVENTOR
JULIUS F. NEUMUELLER
DONALD DODKIN
BY
ATTORNEY Patented Nov. 23, 1943

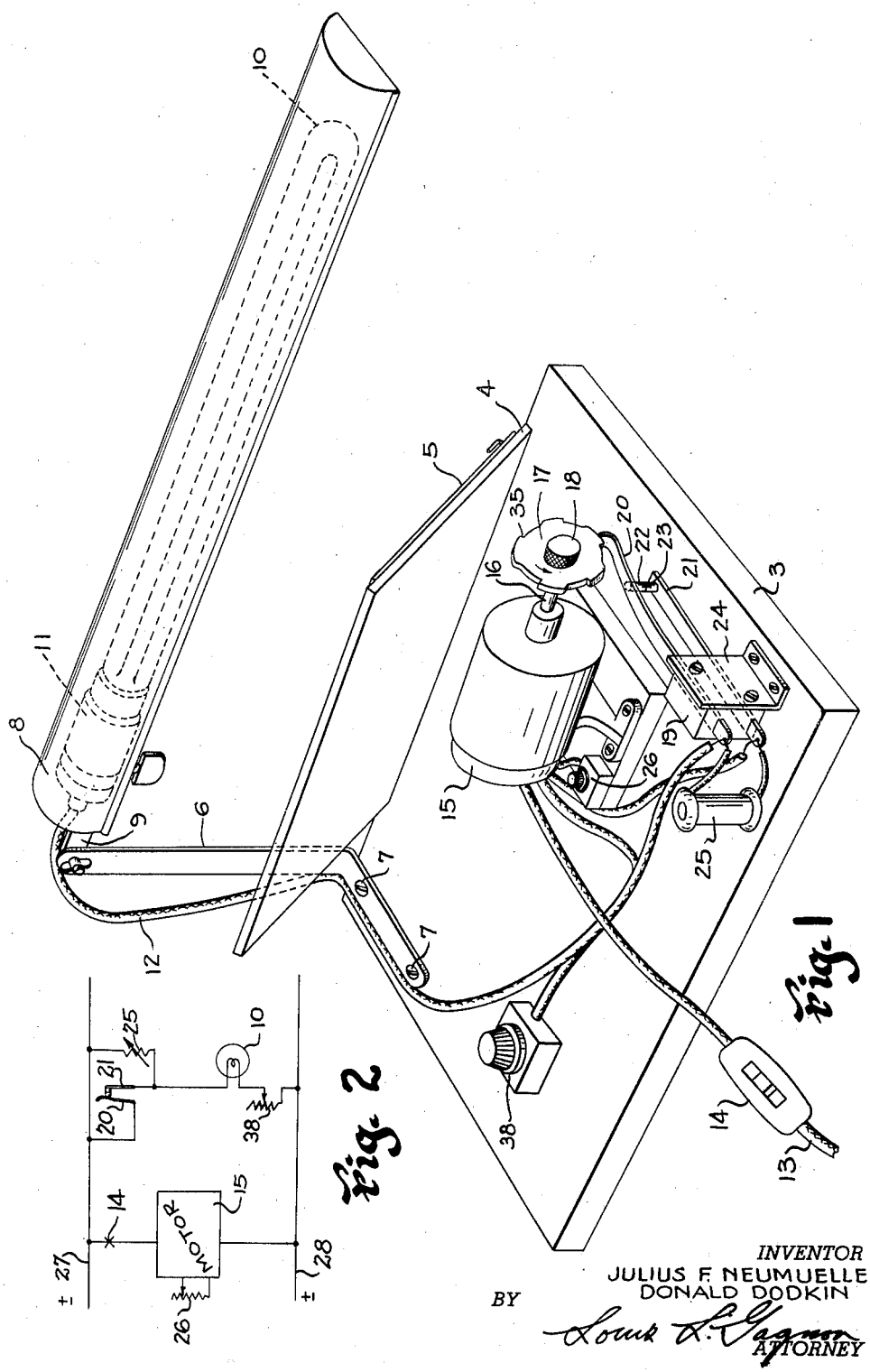

2,335,076

UNITED STATES PATENT OFFICE 2,335,076

ORTHOPTIC INSTRUMENT

Julius F. Neumueller, Dudley, and Donald Dodkin, Southbridge, Mass., assignors to American Optical Company, Southbridge, Mass., a voluntary association of Massachusetts Application October 13, 1941, Serial No. 414,813

2 Claims. (Cl. 128—76.5)

This invention pertains to orthoptic instruments and more particularly to a novel means and method of an eye exercising device for stimulating the retinal elements.

Heretofore, instruments have been devised for exercising the eyes of an individual to improve certain known conditions. The present invention particularly refers to a novel device to exercise the eyes of an individual having amblyopia.

One may think of amblyopia as an obstruction in the conductivity of the visual nerve fibers or as a block in response to stimulation in the visual centers. Investigation has proven that amblyopes have a lowered threshold for movement when a light is turned on after the amblyope has been in a dark or semi-dark room. After the light remains on for a short period of time, this sensitivity is reduced. A relatively high impulse frequency in the visual nerve fiber is produced at the moment the light comes on and that within a short period of time, approximately one second, the current drops off to an "adaptation" level commensurable with the illumination. When the light is turned off, a relatively pronounced "off effect" in the retinal potential occurs, and after a short period of time, the current becomes lowered to the normal resting potential.

The present invention takes advantage of this condition in that it embraces a novel device for stimulating and exercising amblyopic eyes, and is in fact a device employing an automatic switching and controlled timing mechanism for making and breaking circuit continuity of an illumination means preferably disposed adjacent a fixation target.

The present invention is used for the treatment of eyes with a view to bringing about a better coordinating effort between the two eyes in instances where an amblyopic condition exists. The coordinated effort is stimulated through the use of reading matter placed within the field of vision of the two eyes which reading matter is adapted to be read by the individual during intermittent stimulating of the eyes by a flashing light.

The treatment is brought about through the provision of reading matter which permits successive fixations during the effort on the part of the individual to read and assimilate the context of the reading matter. This in itself tends to stimulate concentration and provide more positive functioning for stimulating the desire of the amblyopic eye to read. The stimulation of the eye is further increased by the flashing of the source of illumination which illuminates the reading matter, which flashing accomplishes the result herein described. The initial treatment is to blank out the good eye and thereby direct all the seeing effort to the amblyopic eye. This is brought about by having the individual under treatment attempt to read and assimilate the context of the reading matter during the simultaneous turning on and off of the source of illumination which illuminates said reading matter. In this manner the visual perception is stimulated in the amblyopic eye (by perception, of course, is meant the meaningful response to stimulation). This treatment of the amblyopic eye is continued until the visual acuity of the said eye returns to substantially a normal state, after which both of the eyes are exercised together. The intent of exercising both of the eyes together is to stimulate the effort of the two eyes to respond synchronously. The coordination of the reading matter with the flashing illumination tends to bring about successive accommodative and convergent efforts of the two eyes through the simultaneous stimulation of the amblyopic eye which causes said eye to want to function, and coordinate with the good eye. Eventually this effort brings about a balance between the accommodative and convergent efforts of the two eyes, whereby the amblyopic condition of the deficient eye will be overcome and the coordinating effort of the two eyes will thereafter tend to exist.

The provision of reading matter in combination with the flashing source of illumination not only provides fixation means on which the two eyes may converge and accommodate, but also provides means whereby such efforts are intermittently introduced. The flashing source of illumination increases these convergences and accommodative actions of the eyes and tends to stimulate the function of the amblyopic eye whereby a resultant balance between the accommodative and convergent efforts of the two eyes will tend to exist.

It is therefore an object of the invention to provide an orthoptic instrument for exercising an eye of an individual by turning on and off a source of illumination at periodic intervals.

A further object of the invention is to provide an exercising device for amblyopic eyes which will intermittently turn on and off the source of illumination while the individual is attempting to read.

A further object of the invention is to effect stimulation of concentration of the eyes through the effort of the individual to assimilate the context of reading matter by intermittently illuminating said reading matter at controlled periodicity of illumination of variable intensity.

A further object of the invention is to provide an eye exercising device which comprises periodically varying the intensity of a light source to vary the intensity of the action current in the visual nerve fibers.

A further object of the invention is to provide a camming device having a plurality of camming members to vary the time intervals between the changes in illumination intensity.

A further object is to provide an exercising device for an amblyopic eye of an individual, which device has several variables certain of which are, (1) to provide sharp changes in illumination in the fixation field of an individual, (2) to vary the intensity of the illumination in the fixation field of the individual, and (3) to vary the interval between changes of illumination.

While certain specific objects have been set out herein, it is to be understood that the device has other possibilities for eye exercise and that these objects may be and may become apparent to one skilled in the art by a perusal of the disclosure in the present application. The specific arrangement of parts is shown as a preferred arrangement but is by way of illustration only, and other changes and modifications may be made in the apparatus without departing from the spirit of the subjoined claims.

While the present invention discloses a definite timing device for the varying of the light intensity, it is to be understood that any other means may be employed, and that the time between changes in light intensity may be slowed down or speeded up to a pace dependent upon the particular condition of the individual under treatment and the response obtained by the treatment.

In the drawings:

Fig. 1 is a perspective view of the illuminating device directed generally toward a support for reading matter, with a combination switching means and timing device for obtaining the desiratum in the illumination intensity and time interval.

Fig. 2 is an across-the-line diagram showing schematically the diagram for operating device.

Fig. 3 is a graph showing symbolically the current generated in the visual nerve fiber plotted against time as revealed by an electroretinogram.

Figs. 4, 5, 6, and 7 are camming members for varying the frequency of light impulses when said cams are driven by a constant speed motor.

Referring to the drawings and more particularly to Fig. 1, a base board 3 has a chart rack 4 supported thereon with a chart 5 placed on the rack. A bracket 6 is connected to the base 3 by screws 7, with a lamp shade 8 connected to the bracket 6 by means of a variable connecting member 9. A bulb or illuminating source 10 is shown dotted, and is screwed into a socket 11 which is connected to the conductor 12 which in turn is connected to the source of energy coming through the cable 13. A toggle switch 14 is shown located in the cable 13 to turn on and off the source of energy connected to the device.

A motor 15 has a shaft 16 on which is connected a cam 17. A screw 18 has a knurled head thereon for manually removing said screw for the purpose of interchanging the cams. An insulation block 19 has two spaced metallic members 20 and 21 each of which has a contact 22 and 23 respectively. The insulation block 19 is connected to a metallic bracket 24 which is screwed to the base 3. A resistor 25 is shown connected across the contact springs 20 and 21. A rheostat 26 is shown located on the motor 15 and is used for the purpose of varying the speed of the motor in the event a constant speed motor is not used. While a synchronous motor may be used with any desirable gear ratios for controlling the speed of the cam shaft, a variable speed motor may be employed such as is commonly referred to as the universal motor.

Fig. 2 shows an across-the-line diagram having the opposing sides of the current source shown as the conductors 27 and 28, each of which are marked with a plus and minus sign. It is to be understood that either direct or alternating current may be used depending upon the particular equipment used on the device.

The motor 15 is shown having the toggle switch 14 serially connected therewith to the opposing sides of the conductors 27 and 28. The variable speed control switch 26 is shown connected to the motor 15. The source of illumination, or bulb 10, is shown connected serially with the contact springs 20 and 21, and placed across the conductors 27 and 28. A variable resistor 25 is in parallel with the contact springs 20 and 21 so that at all times when the device is in use, a certain amount of energy will be flowing through the bulb 10 so that the filament is constantly heated. The resistor 25 may be of any suitable value to heat the filament so that when the contacts 20—21 are connected, there will be a rapid lighting response. It will be obvious that the resistor may or may not be used depending upon the characteristics of the bulb 10. When the resistor is used, its value will be such that the heated filament will ordinarily be below the normal threshold of vision.

A variable resistance, or rheostat 38 is also serially connected with the bulb 10, the purpose of the rheostat being to vary the intensity of the source of illumination to which the individual under treatment is subjected as the particular case may require.

While a device may be used for exercising the amblyopic eye while the patient is in a dark room, the device may be used in a semi-dark room or under other conditions which will permit a sufficient variation in illumination intensity to provide a suitable variation in action current to properly exercise the eye by fluctuating the action current while the individual is attempting to read.

Referring to Fig. 3, the electroretinogram discloses a schematic graph having the abscissa in seconds with the ordinate as a relative measure of action current.

From the electroretinogram, it will be seen that when the light is turned on, there is a surge of potential toward a peak 30 and the action current immediately thereafter drops toward a point 31. When the current is turned off, the potential again surges toward a peak 32 and then drops toward a low point 33. It will be seen from the graph shown in Fig. 3 that the potential is generated when there is a sudden change in light intensity, and that the potential surges relatively when the light goes on, and when the light goes off. The electroretinogram, shown in Fig. 3, may vary with different individuals but the general theory of response in potential remains essentially the same. This schematic graph is shown only by way of illustration.

The cams 4, 5, 6, and 7 have 1, 2, 3, and 4 drop shoulders 35 respectively. The drop shoulders provide the spring action of the lever 20 to open the contacts 22 and 23 when the cam 17 rotates in the direction shown by the arrow. The cam 17 has five drop shoulders 35.

The circumferential distance of the raised camming surfaces 36 on the various cams is determined by the length of time desired to permit the light to stay "on," while the circumferential distance of the lower camming surface 37 is determined by the length of time that the light should remain "off." Therefore, the design of the particular cam would be dependent upon the "on" and "off" periods desired, and the duration of same. Consequently, the device is shown with several different cams, each with a different number of impulsing surfaces so that they may be interchanged and used with a motor of given speed.

The various cams are used to provide a variation in time intervals between energization of the bulb 10 so that with the cam shown on the motor in Fig. 1, there will be five "on" intervals to each revolution of the motor shaft. Therefore, the electroretinogram would show that for each revolution of the cam 17, there would be ten peak surges five of which would be when the current in the bulb was increased, and the other five when the current in the bulb was decreased. With the cams shown in Figs. 4, 5, 6, and 7 the action currents would attain 2, 4, 6, and 8 peak surges respectively for each revolution of the motor shaft. The speed of the motor may be varied by the rheostat 26 if it is desired. It is therefore pointed out that two sources are shown as being available for varying the peak surges, namely the number of teeth on the cam, and the speed of the motor. The motor has a very slow rotating output shaft but any suitable motor and gearing may be used to get a desirable speed control.

The light intensity of the bulb may be varied by changing the bulb so that its characteristics will afford various degrees of illumination. The foot-candles, it being understood being constant for each of the various bulbs used, while the variable resistor 25 may be set to permit any degree of preheating that may be desirable in the bulb 10.

From the foregoing, it will be seen that by periodically varying the intensity of the light source the retinal elements may be stimulated so that the variation in the impulse frequency conducted by the visual nerve fibers may be such as to stimulate vision and therefore reduce the degree of amblyopia, if the orthoptic instrument is employed under proper supervision.

While a preferred embodiment of the invention is set forth, it is to be understood that it is by way of illustration only and that modifications may be made within the spirit of the invention as defined by the subjoined claims.

The chart 5 is preferably in the form of reading matter having a given context which, during the treatment, the individual is to attempt to assimilate or may be any other suitable means which will bring about intermittent and progressive eye fixations.

Having described our invention, we claim:

1. In a device of the character described the combination of a support having indicia thereon adapted to be positioned within the field of vision of an individual and to be viewed by said individual, means for illuminating the indicia embodying an electric bulb having filament type illuminating means, circuitous means for connecting said bulb with a source of electrical energy, resistance means in said circuit for normally maintaining the filament of the bulb heated while the intensity of the bulb is below the threshold of vision, switch-like means in said circuit having associated therewith means for intermittently and successively opening and closing said switch means, said switch means when closed being adapted to by-pass the resistance means to provide a direct circuit to the filament of the bulb to cause the intensity thereof to be above the threshold of vision.

2. In a device of the character described the combination of a support having reading matter thereon adapted to be positioned within the field of vision of an individual and to be viewed by said individual, illumination means for illuminating said reading matter, circuitous means for connecting said illuminating means to a source of electrical energy, resistance means in said circuit for normally maintaining the electrical energy to an amount whereby the intensity of the illuminating means will be maintained below the threshold of vision, switch-like means in said circuit having associated therewith means for intermittently and successively opening and closing said switch means, said switch means when closed being adapted to by-pass the resistance means to provide a direct circuit to the illuminating means to cause the intensity thereof to be above the threshold of vision.

JULIUS F. NEUMUELLER.
DONALD DODKIN.